United States Patent Office.

DANIEL SHATTUCK, OF BUFFALO, NEW YORK.

Letters Patent No. 63,314, dated March 26, 1867.

---

IMPROVED SOAP COMPOUND FOR CLEANING AND SCOURING WOOL, SILK, &c.

---

The Schedule referred to in these Letters Patent and making part of the same.

---

Be it known that I, DANIEL SHATTUCK, of Buffalo, in the county of Erie, and State of New York, have invented a new and useful Saponaceous Compound for fulling, scouring, and cleansing purposes, of which the following is a full, clear, and exact description of the method of preparing the same for use.

The object of my invention is to produce a saponaceous compound, which is designed to be used more particularly in fulling, scouring, and cleansing silk and woollen goods as manufactured in the country, though it may be used to advantage for other cleansing purposes.

The process of manufacturing this compound is as follows: I take one hundred and fifty pounds of tallow, fifty pounds of olive or cotton-seed oil, ten pounds of flaxseed oil, and place the same in a kettle, adding a sufficient quantity of lye to thoroughly saponify it, commencing with a strength of from 10° to 12°. I then take fifteen pounds of fine rye flour, and saturate it with water sufficiently to break all lumps which may be in the meal. This solution is then placed in a kettle with fifteen gallons of boiling water, and five gallons of lye of 15° in strength is then added, the whole being boiled, with constant stirring, until the substance becomes a perfect jelly. This jelly is then mixed with the first saponified mass, with constant stirring, and the whole being kept boiling, lye is added from 15° to 25° of strength, until the combination of the bases is complete. To this are then added two and a half pounds of spermaceti, one-half pound of isinglass in a solution of borax not exceeding a pound for the above-named amount. The composition may then be run into barrels; and after standing twenty-four hours is ready for use. It may also be cut into bars or cakes, for commercial purposes.

It may be found necessary to vary the proportions of oils used, in counteracting the effect of the different qualities of water used in different localities, some water making it necessary to have a heavier base for the composition than others; as, for instance, when the water is largely impregnated with lime, the composition will require a larger proportion of the oils; but when the water is perfectly pure, the tallow may be dispensed with, and a larger proportion of the cocoa-nut oil used.

I have found by experiment that the large proportion of gluten contained in rye flour is especially adapted to impart a fine finish and brilliant lustre to both silk and woollen goods, which will render the latter equal in appearance and quality to those shown in goods of foreign manufacture, and which render the latter so much more desirable than similar goods of domestic manufacture, thus enabling the home manufacturer to successfully compete with the foreign article.

The flour of barley or oats, which contains a less proportion of gluten than rye, may be used instead of rye, in combination with certain waters, if found desirable.

What I claim as new, and desire to secure by Letters Patent, is—

A soap formed by the combination of the ingredients above described, substantially in the manner and proportions specified.

In testimony whereof I have signed my name to this specification in the presence of two subscribing witnesses.

DANIEL SHATTUCK.

Witnesses:
J. H. ADAMS,
HERBERT TORREY.